United States Patent
Peterson et al.

(10) Patent No.: US 11,837,809 B2
(45) Date of Patent: Dec. 5, 2023

(54) DIRECT DEVICE ELECTRICAL CONNECTION TO FLEXIBLE CIRCUITS OR OTHER CONDUCTORS

(71) Applicant: Aptiv Technologies Limited, St. Michael (BB)

(72) Inventors: David R. Peterson, Aurora, OH (US); Joseph Sudik, Jr., Niles, OH (US); Duane Lee Brantingham, Cortland, OH (US); Eric E. Shasteen, Salem, OH (US)

(73) Assignee: Aptiv Technologies (2) S.à r.l., Luxembourg (LU)

( * ) Notice: Subject to any disclaimer, the term of this patent is extended or adjusted under 35 U.S.C. 154(b) by 0 days.

(21) Appl. No.: 17/471,916

(22) Filed: Sep. 10, 2021

(65) Prior Publication Data
US 2022/0094093 A1    Mar. 24, 2022

Related U.S. Application Data

(60) Provisional application No. 63/077,855, filed on Sep. 14, 2020.

(51) Int. Cl.
*H01R 12/77*    (2011.01)

(52) U.S. Cl.
CPC .................. *H01R 12/774* (2013.01)

(58) Field of Classification Search
None
See application file for complete search history.

(56) References Cited

U.S. PATENT DOCUMENTS

| 5,356,308 A * | 10/1994 | Toba | H01R 13/5219 439/495 |
| 7,165,991 B2 * | 1/2007 | Sato | H01R 12/592 439/492 |
| 10,790,614 B1 * | 9/2020 | Chen | H01R 12/721 |

FOREIGN PATENT DOCUMENTS

WO    2005041361 A1    5/2005

OTHER PUBLICATIONS

Partial European Search Report dated Aug. 2, 2022. 9 pages.

* cited by examiner

*Primary Examiner* — Ross N Gushi
(74) *Attorney, Agent, or Firm* — Miller Johnson

(57) ABSTRACT

An electrical system comprises a flexible circuit (FC) comprising at least one conductive circuit trace disposed within or between one or more dielectric layers and defining at least one exposed conductive circuit trace portion, an electrical device system comprising an electrical device disposed within a housing and at least one conductive terminal electrically connected to the electrical device and that extend substantially to an end of the housing, and an electrical connector configured to physically secure and electrically connect the at least one exposed conductive circuit trace portion to the at least one conductive terminal of the electrical device system, wherein the electrical connector and the housing of the electrical device system define at least one connection feature for physically securing to each other.

20 Claims, 14 Drawing Sheets

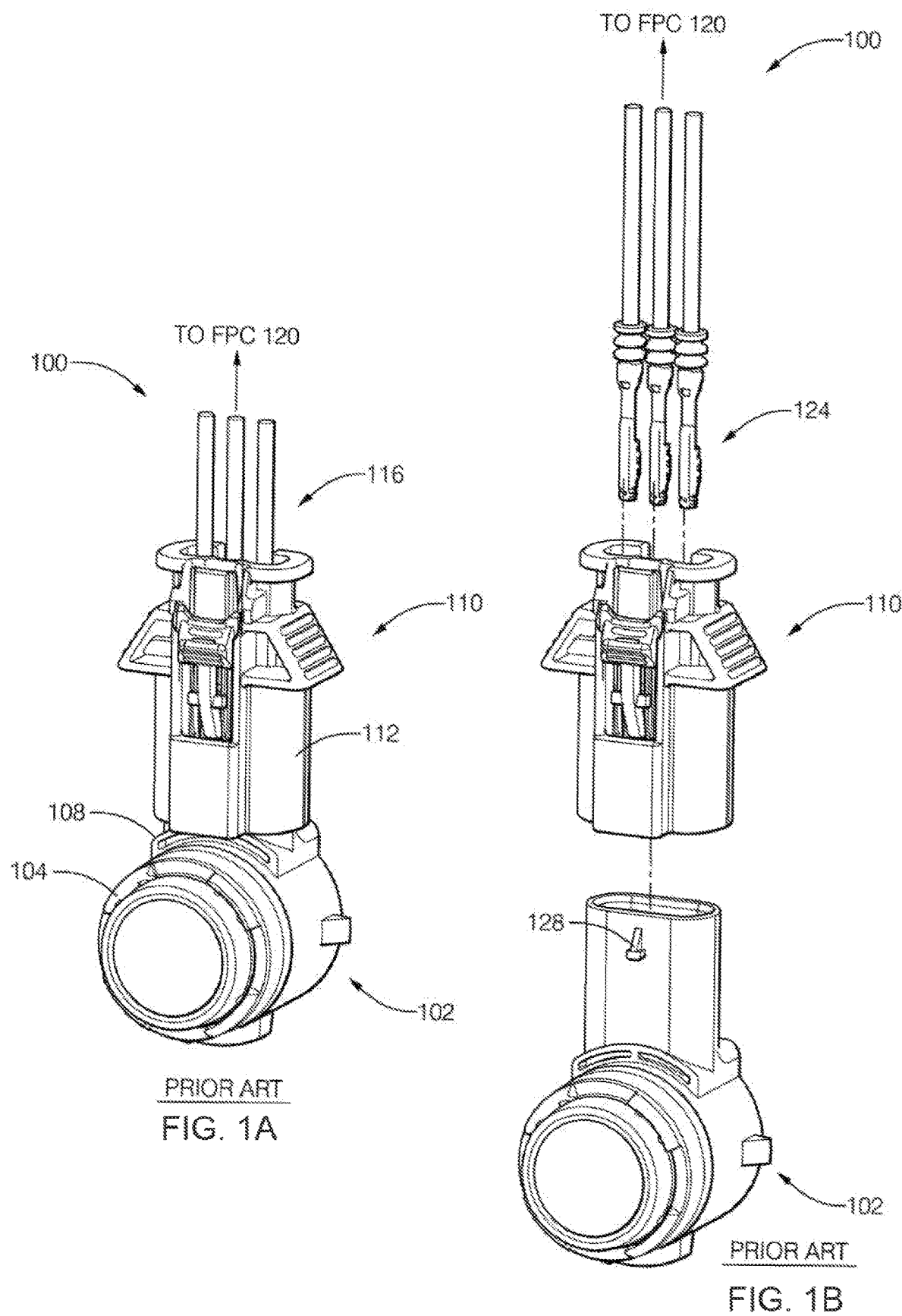
PRIOR ART
FIG. 1A
PRIOR ART
FIG. 1B

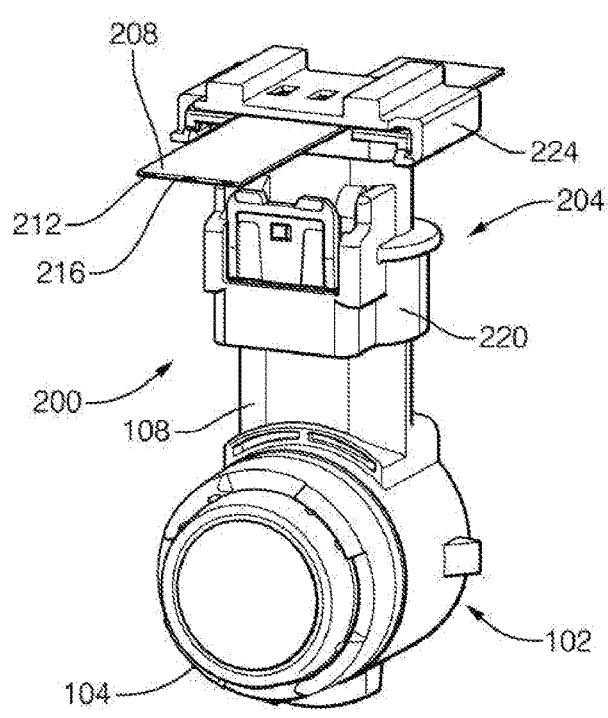
FIG. 2A
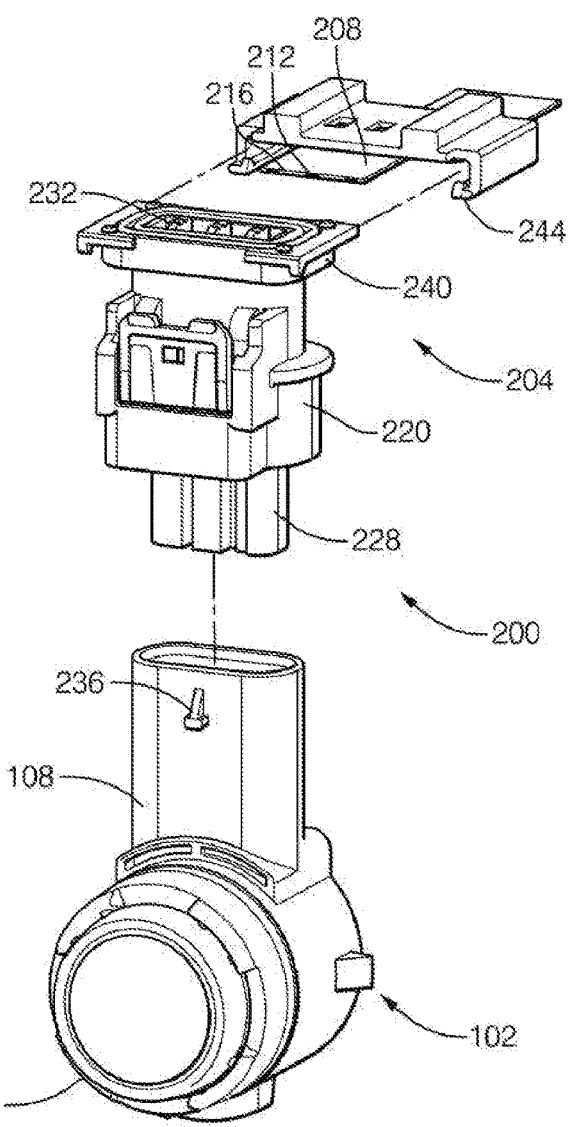
FIG. 2B

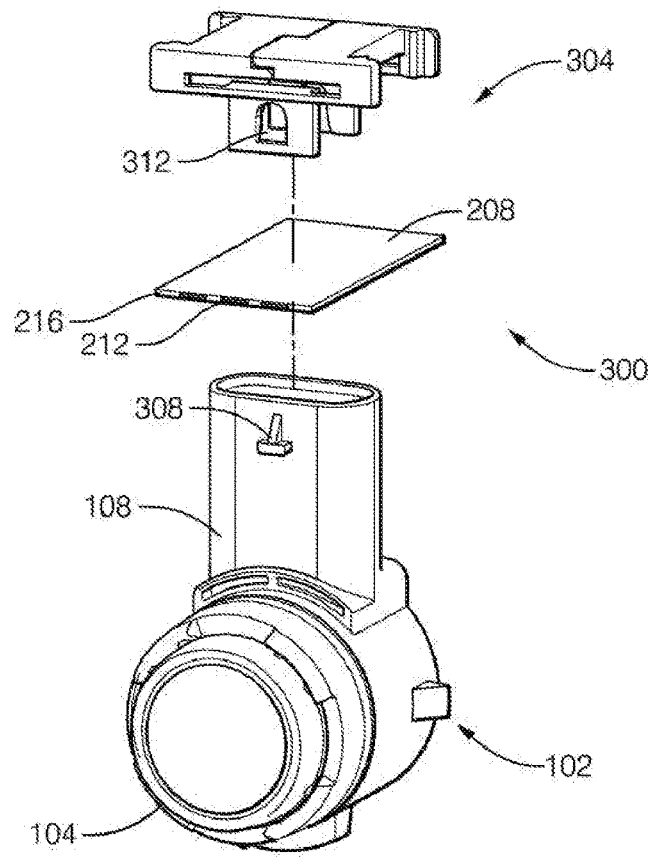
FIG. 3A
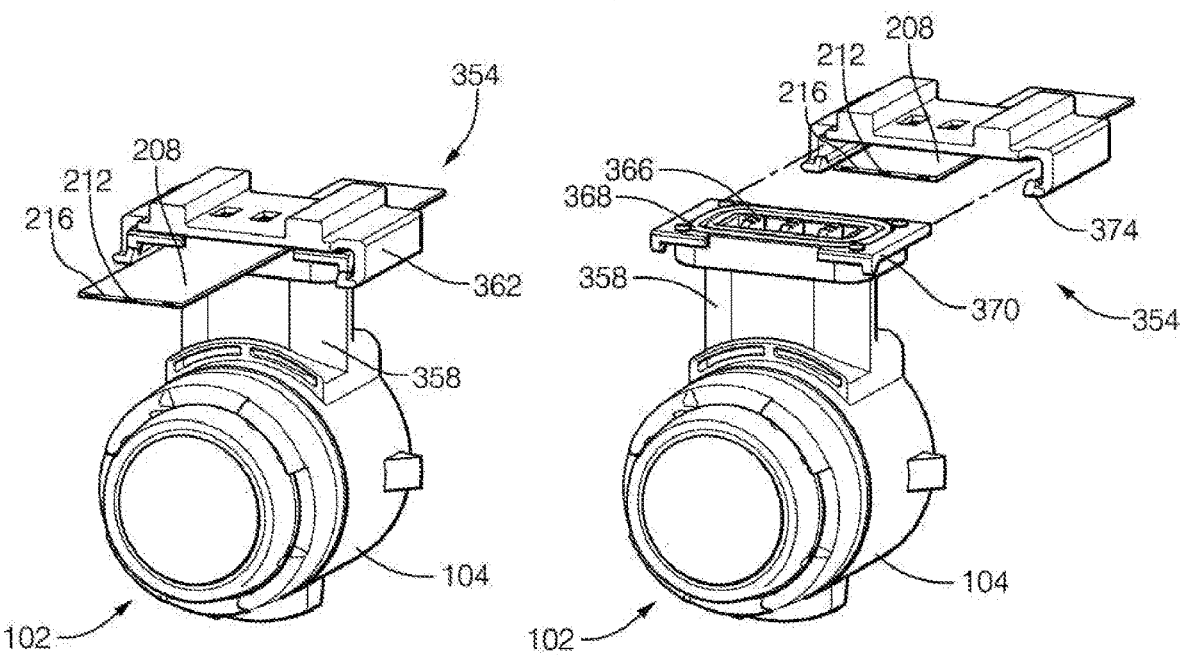
FIG. 3B    FIG. 3C

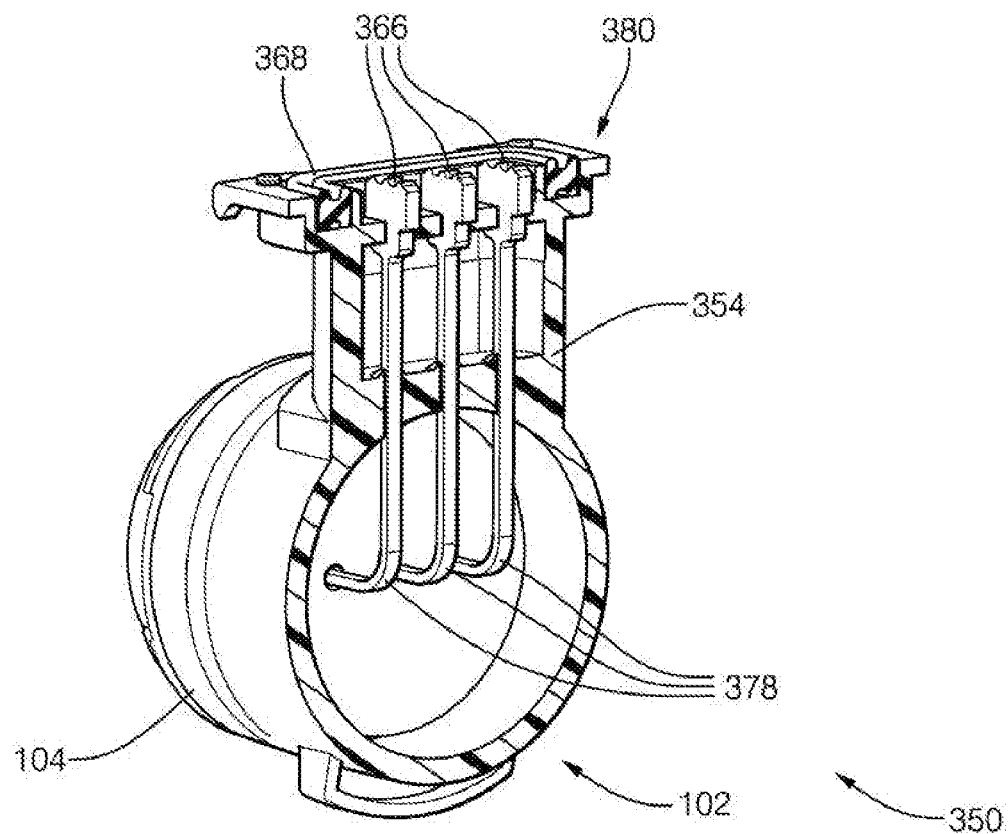
FIG. 3D
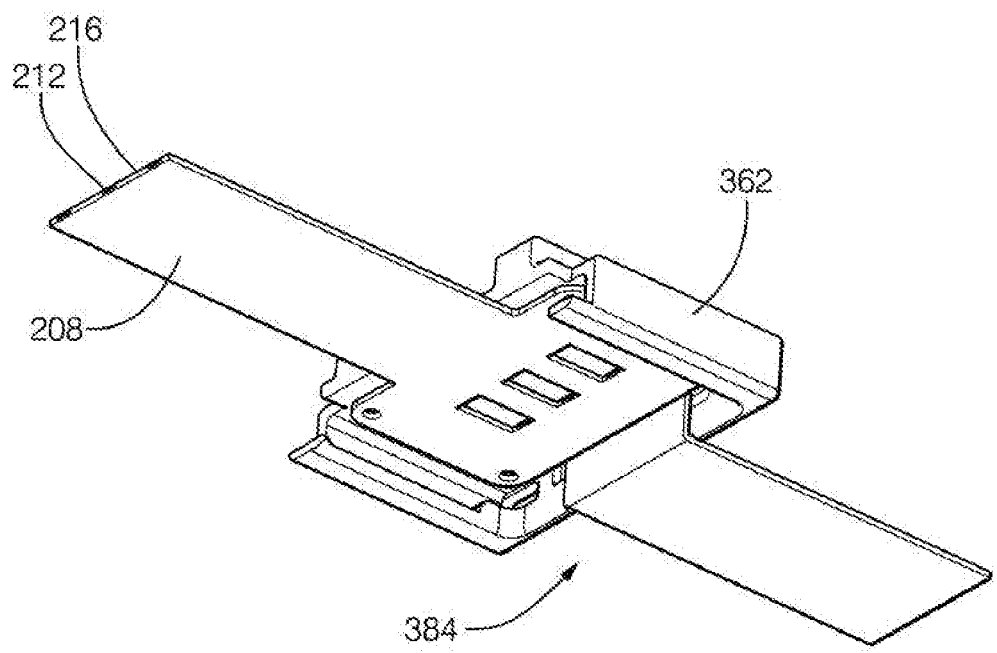
FIG. 3E

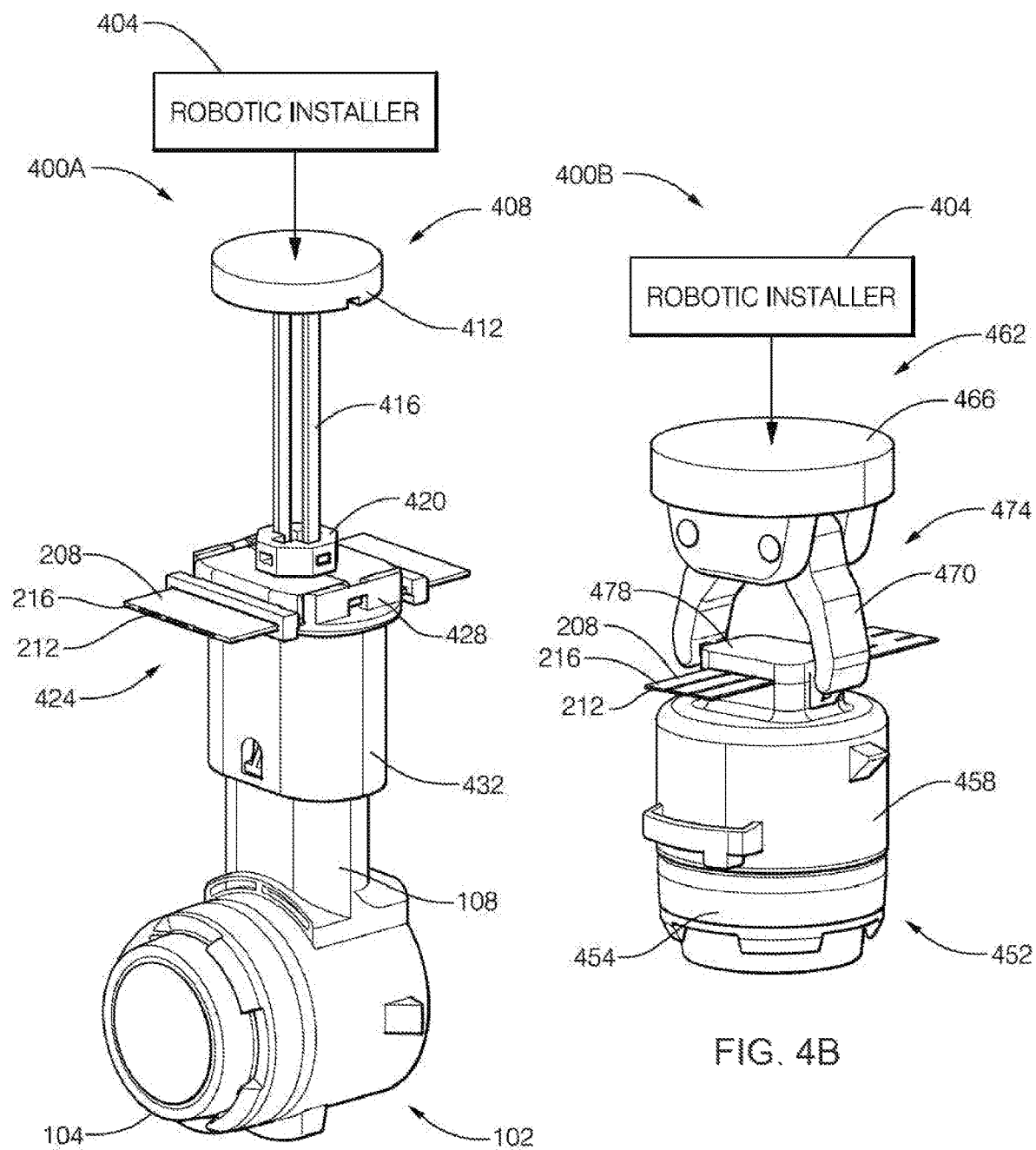

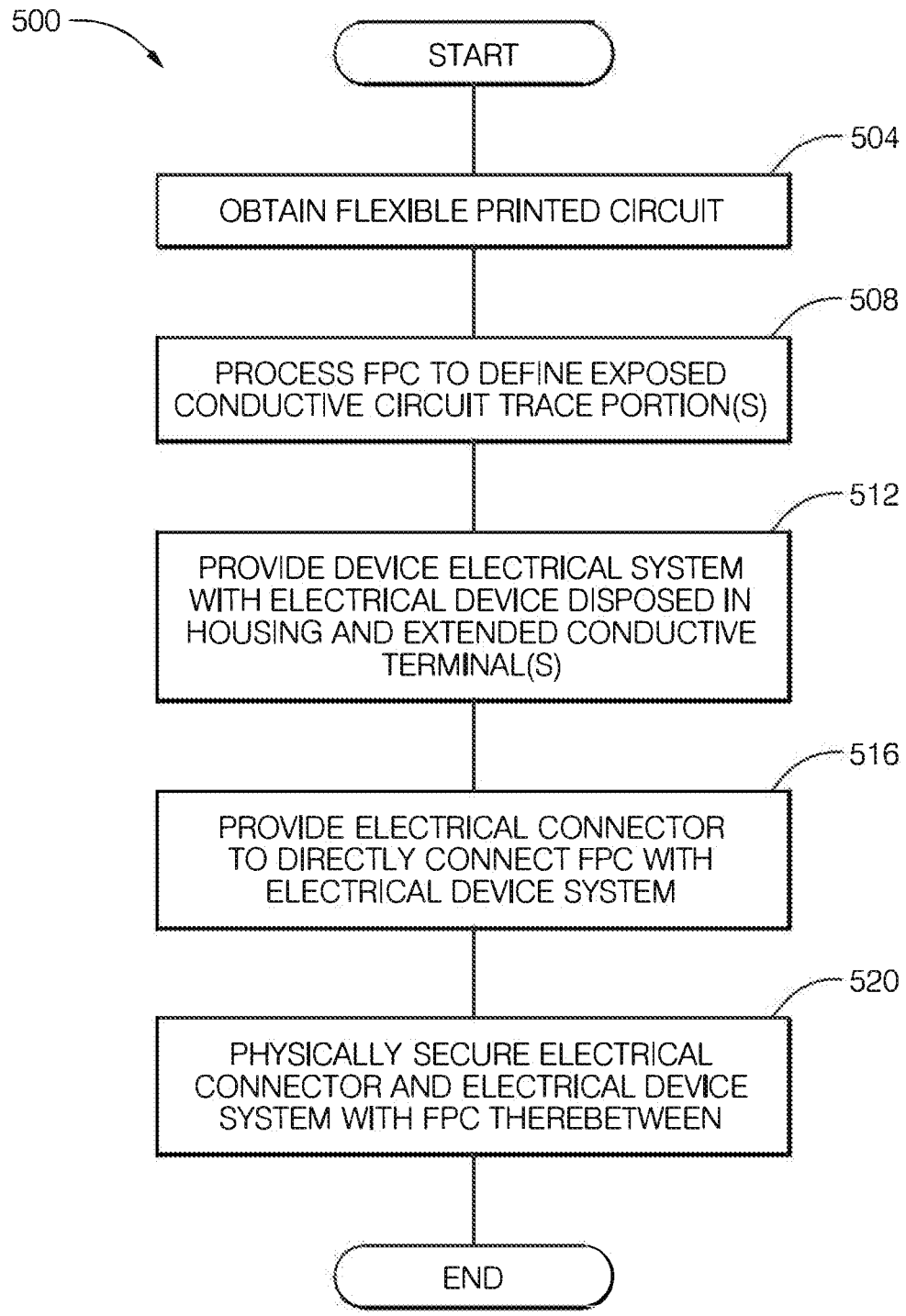
FIG. 5

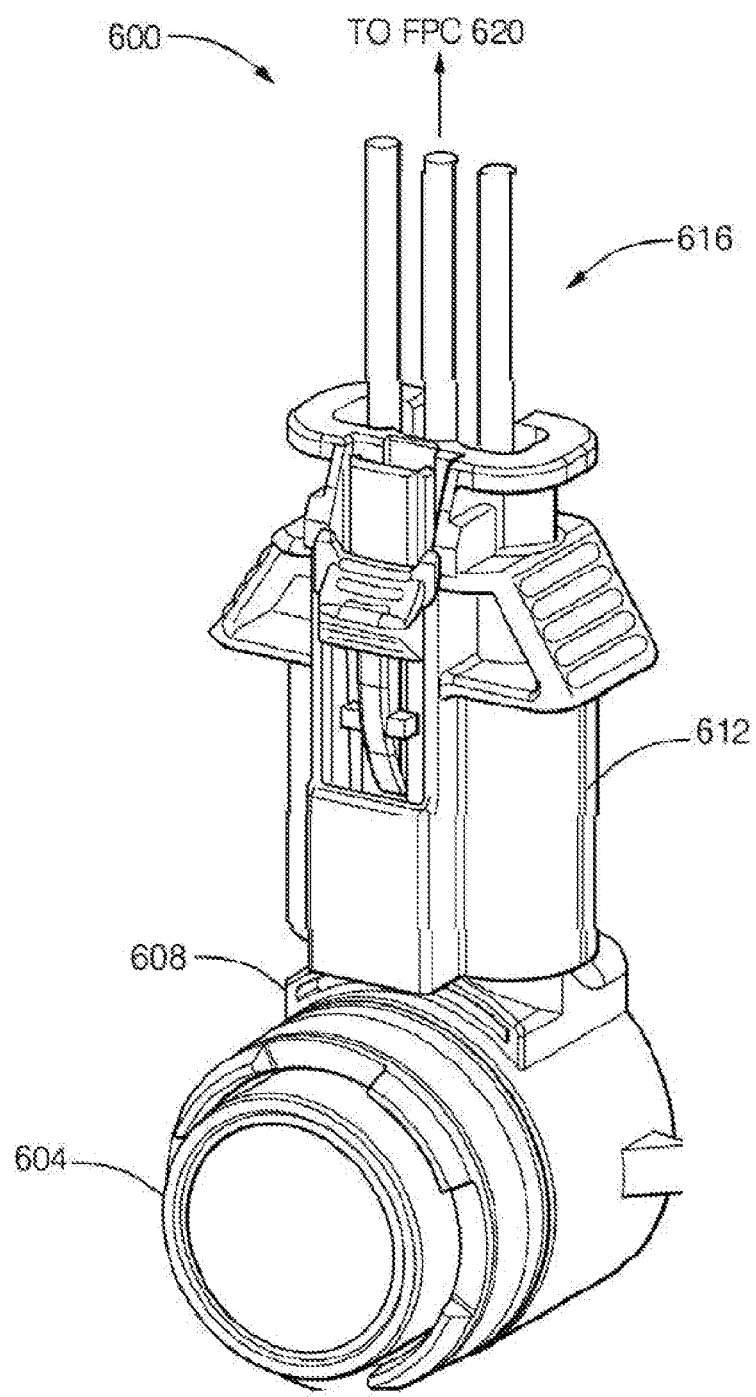
PRIOR ART
FIG. 6

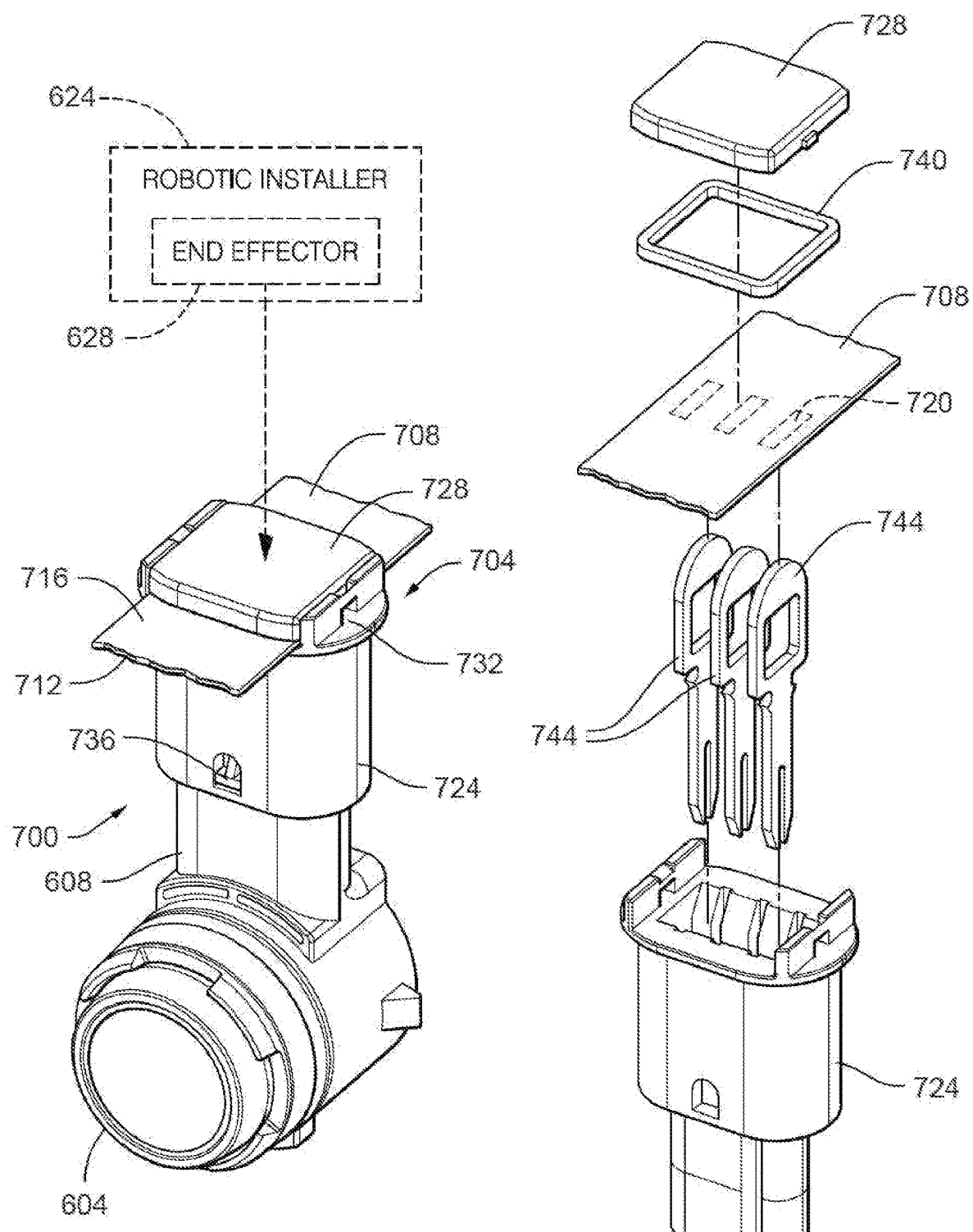
FIG. 7A
FIG. 7B

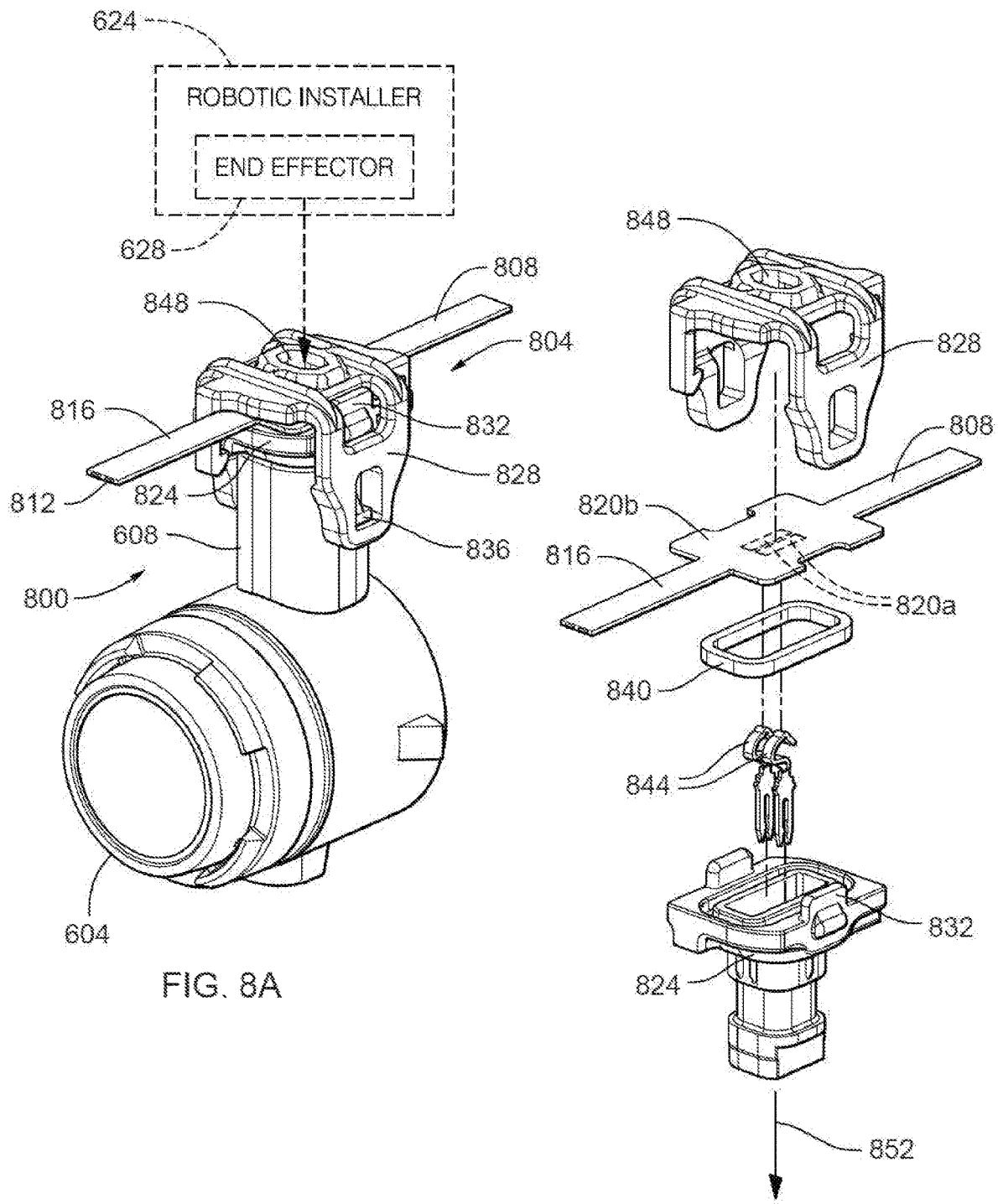
FIG. 8A
FIG. 8B

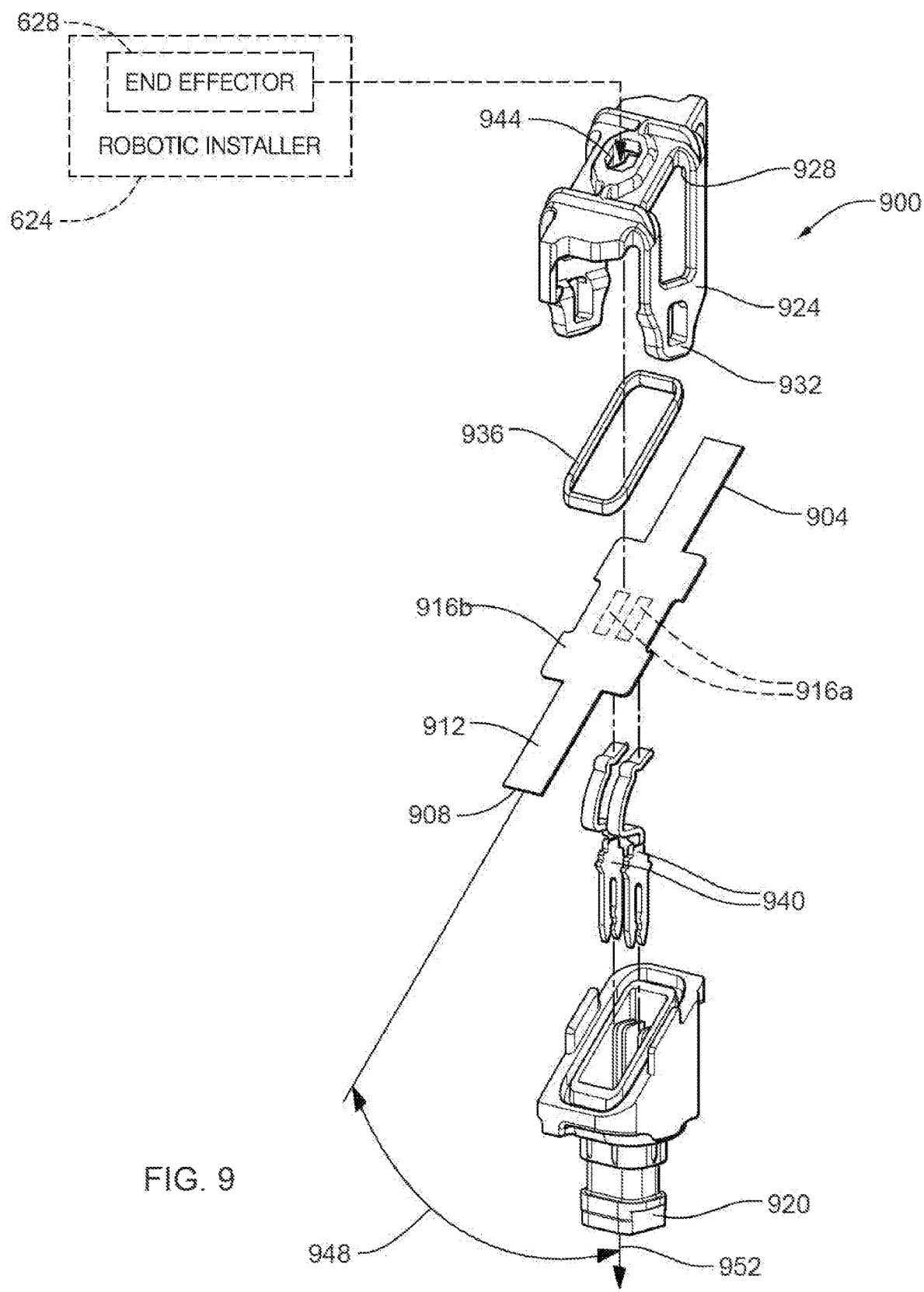
FIG. 9

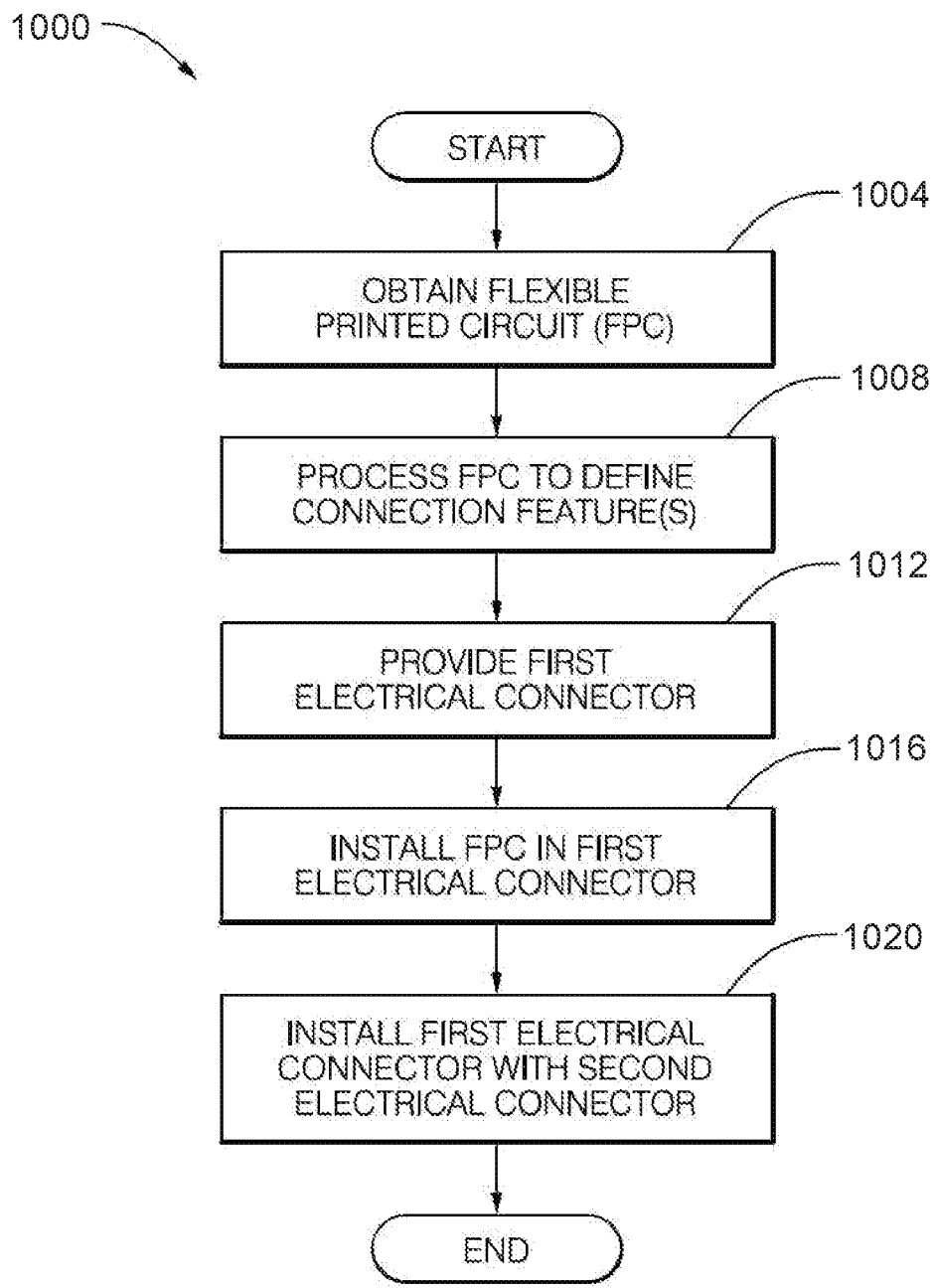
FIG. 10

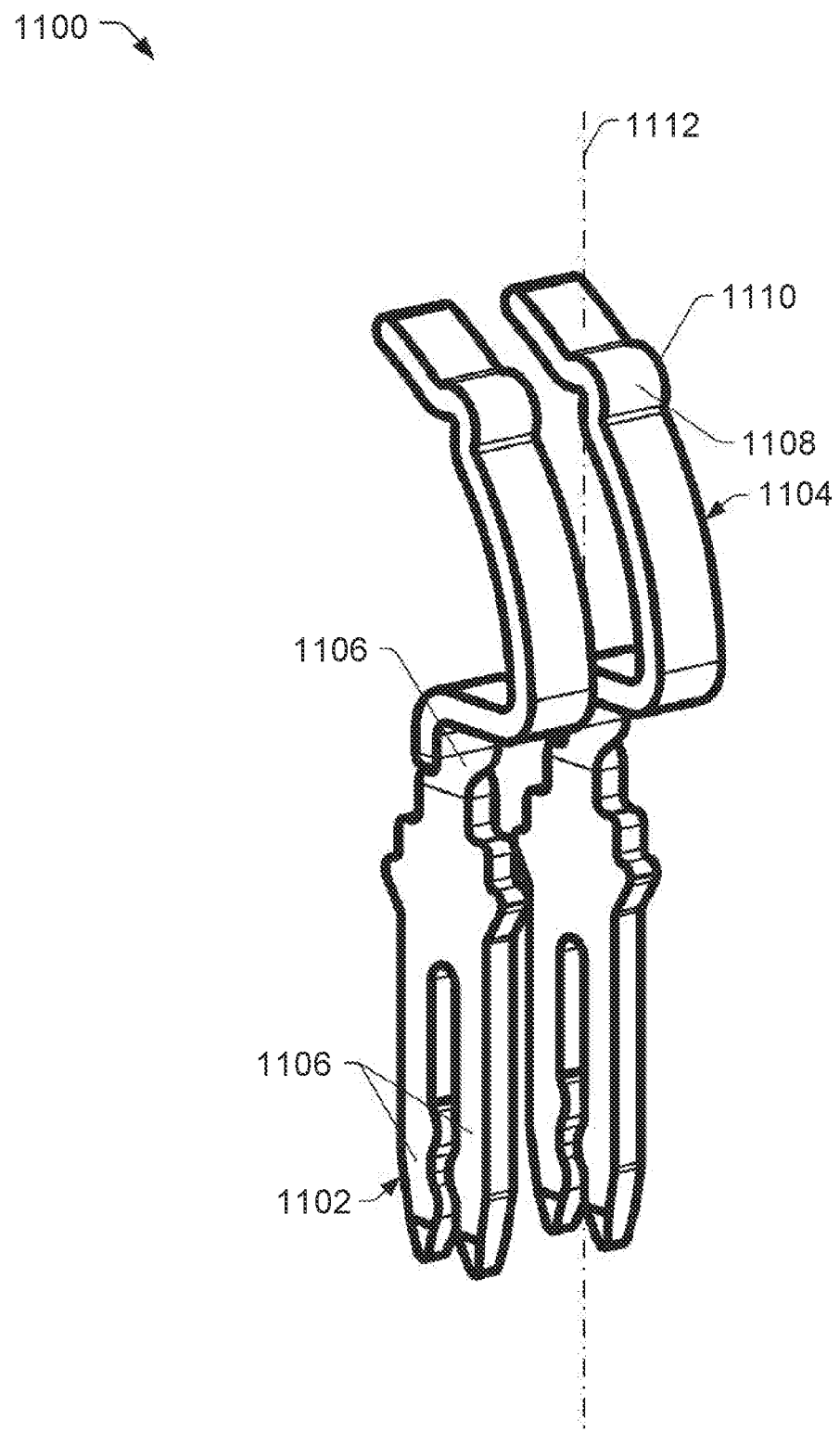
FIG. 11

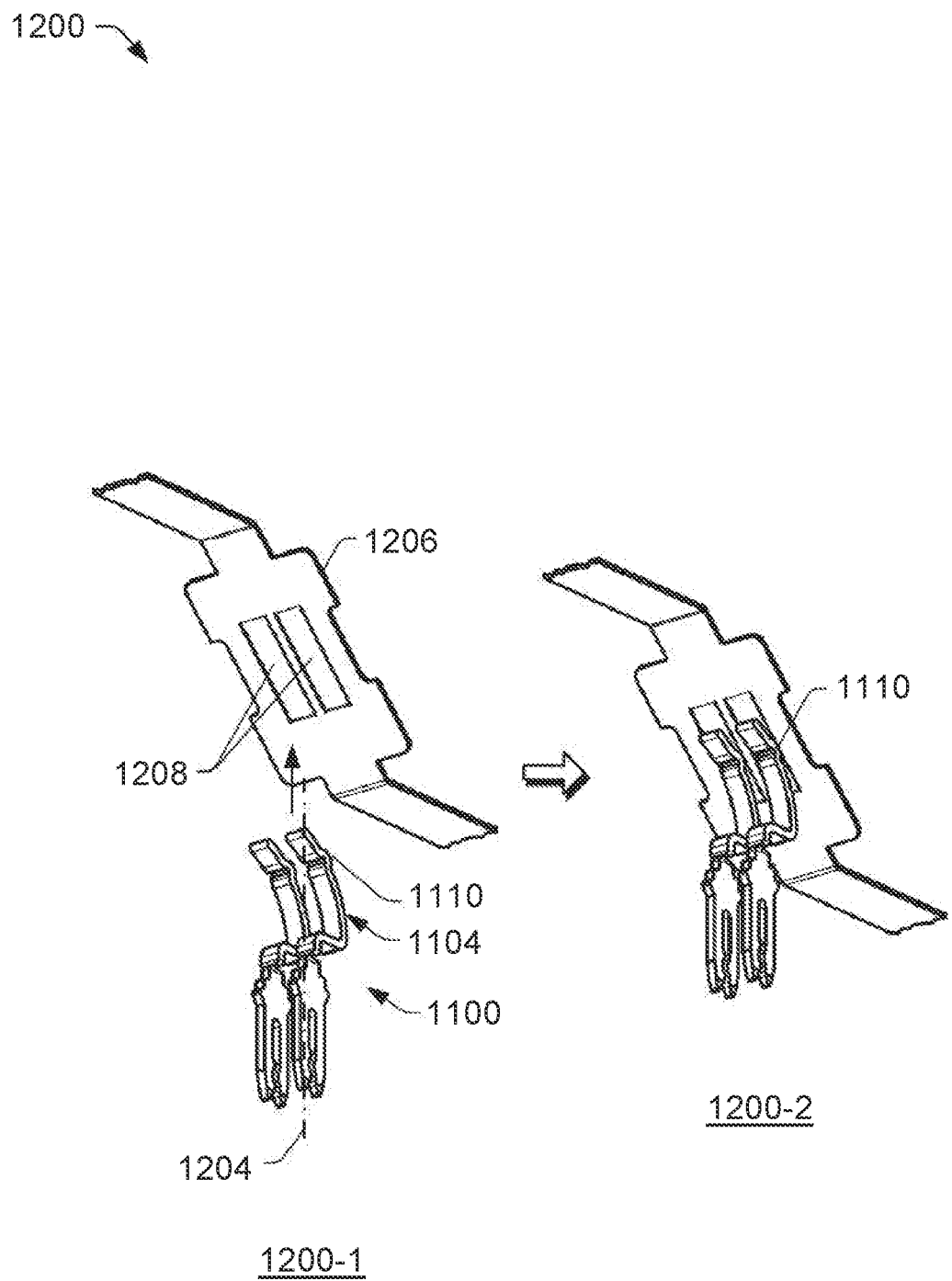
FIG. 12

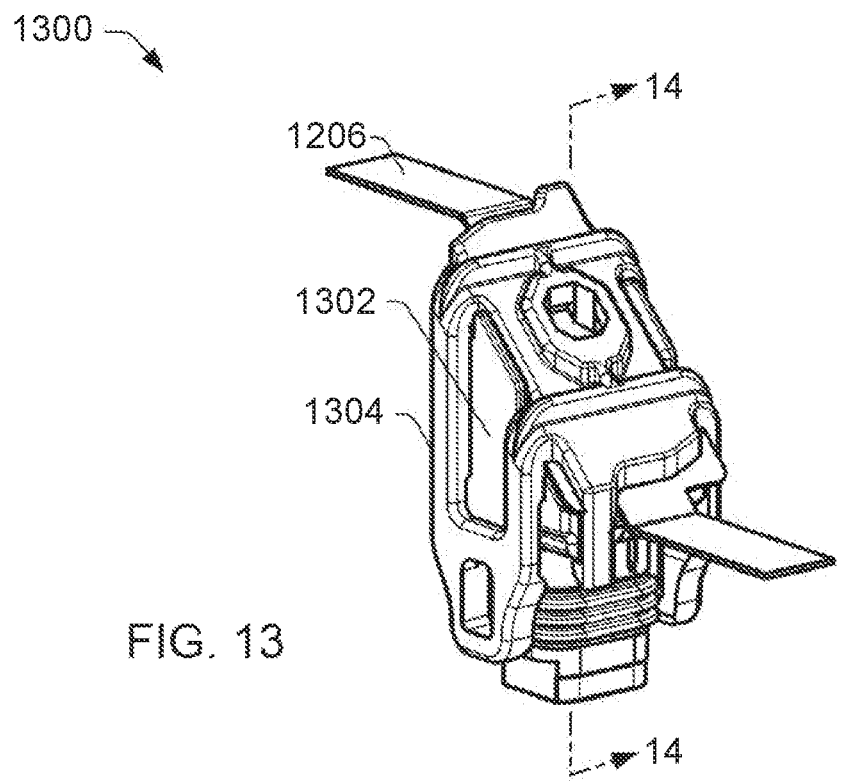
FIG. 13
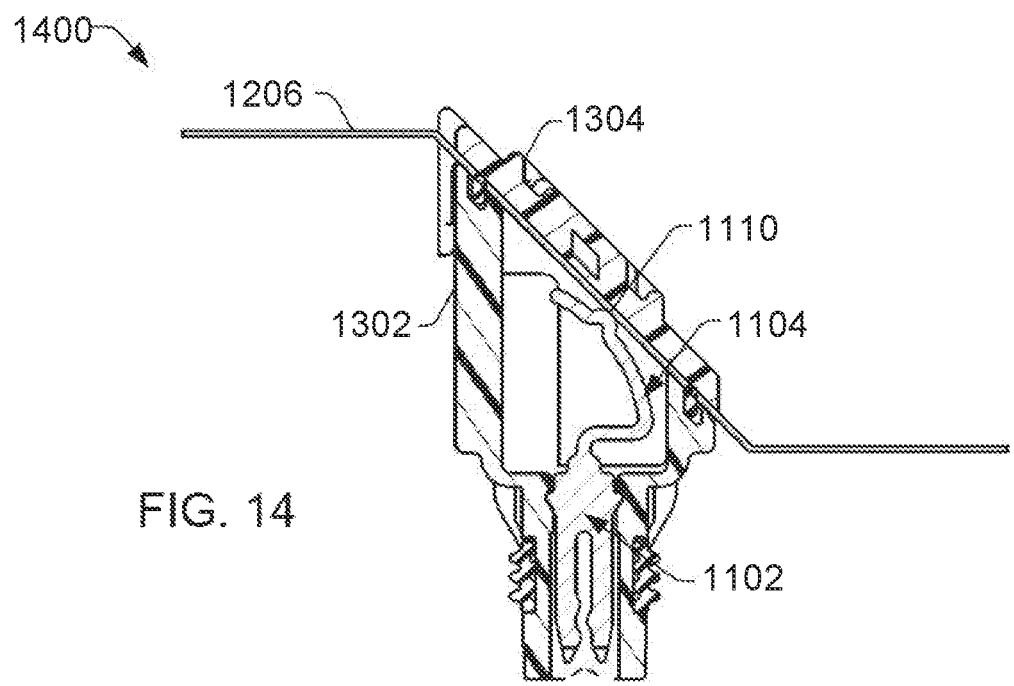
FIG. 14

DIRECT DEVICE ELECTRICAL CONNECTION TO FLEXIBLE CIRCUITS OR OTHER CONDUCTORS

CROSS-REFERENCE TO RELATED APPLICATION(S)

This application claims the benefit of U.S. Provisional Application No. 63/077,855, filed on Sep. 14, 2020. The disclosure of this application is herein incorporated by reference in its entirety.

FIELD

The present disclosure generally relates to automotive electrical connectors and, more particularly, to systems and methods for direct device electrical connection to flexible circuits (FCs) or other conductors.

BACKGROUND

A flexible circuit (FC) comprises one or more conductive circuit traces disposed within or between one or more dielectric layers. One conventional method for electrically connecting an FC to another electrical system involves permanently connecting the FC to the other electrical system via soldering, crimping, or similar means. FIGS. 1A-1B, for example, illustrate an example electrical system 100 according to the prior art. An electrical device system 102 comprises an electrical device 104 (e.g., an automotive radar device) housed by a housing 108 to form a male electrical connector that electrically connects to a female electrical connector 110 via a connection position assurance (CPA) feature 128 (e.g., a clip or notch). The female electrical connector 110 comprises a housing 112 that houses one or more round wires 116 with corresponding terminal(s) 124 that extend through the housings 108 and 112 to the electrical device 104. These round wire(s) 116 are also permanently connected to the conductive circuit trace(s) of an FC 120 (not shown) via soldering, crimping, or similar means. It would be desirable to provide an electrical connection between an FC and another electrical system that is detachable or removable (e.g., when component damage occurs). Additionally, conventional FC electrical connectors are bulky and can take up valuable packaging space and/or increase weight. Thus, while conventional FC connection methods work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an electrical system, is presented. In one exemplary implementation, the electrical system comprises a flexible circuit (FC) comprising at least one conductive circuit trace disposed within or between one or more dielectric layers and defining at least one exposed conductive circuit trace portion, an electrical device system comprising an electrical device disposed within a housing and at least one conductive terminal electrically connected to the electrical device and that extend substantially to an end of the housing, and an electrical connector configured to physically secure and electrically connect the at least one exposed conductive circuit trace portion to the at least one conductive terminal of the electrical device system, wherein the electrical connector and the housing of the electrical device system define at least one connection feature for physically securing to each other.

In some implementations, the at least one connection feature comprises two opposing clips defined by the housing of the electrical device that are configured to be mated to two corresponding opposing apertures defined by the electrical connector. In some implementations, the at least one connection feature comprises two opposing edges defined by the housing of the electrical device system that are configured to be slidably inserted into two corresponding opposing slots defined by the electrical connector. In some implementations, the FC further defines a stepped configuration when physically secured by the electrical connector. In some implementations, the electrical connector defines a slot that is configured to be engaged by an end effector of a robotic installer to at least one of (i) physically connect the electrical connector to the electrical device system with the FC therebetween and (ii) move and install the electrical system within another electrical system. In some implementations, the electrical connector defines at least one graspable feature that is configured to be grasped by an end effector of a robotic installer to at least one of (i) physically connect the electrical connector to the electrical device system with the FC therebetween and (ii) move and install the electrical system within another electrical system.

In some implementations, the FC comprises three conductive circuit traces and defines three exposed conductive circuit trace portions, and wherein the electrical device system comprises three conductive terminals. In some implementations, the three conductive terminals are spring terminals that are configured to forcibly contact the three exposed conductive circuit trace portions of the FC to electrically connect the electrical device to the FC. In some implementations, the electrical device is a radio wave detection and ranging (RADAR) device. In some implementations, the at least one conductive terminal comprises a split-blade terminal having two prongs separated by a distance and configured to interface with another electrical terminal of the electrical device, and a spring terminal configured to mate with at least one exposed conductive circuit trace portion of the at least one conductive circuit trace of the FC, wherein the spring terminal and the split-blade terminal are positioned on a longitudinal axis at opposing ends of the electrical connector, and wherein the spring terminal comprises bifurcated contacts that are configured to interface with the at least one exposed conductive circuit trace portion of the at least one conductive circuit trace of the FC.

According to another aspect of the present disclosure, an electrical system is presented. In one exemplary implementation, the electrical system comprises a flexible circuit (FC) comprising a conductive circuit trace disposed within or between one or more dielectric layers and defining one or more connection features formed by laser processing, and a first electrical connector configured to physically secure and electrically connect the FC to a corresponding second electrical connector, wherein the first electrical connector comprises first and second members configured to connect to each other with the FC secured therebetween and to electrically connect to the FC using the one or more connection features.

In some implementations, the FC defines first and second portions having different widths via the laser processing, and wherein a wider of the first and second portions is one or the one or more connection features. In some implementations, the first electrical connector further comprises a seal disposed between the first and second connectable members and surrounding the FC such that it is sealed between the first and second connectable members. In some implementations, the one or more connection features comprise an exposed portion of the conductive circuit trace where at least some of the one or more dielectric layers has been removed via the laser processing. In some implementations, the first and second connectable members define a first set of connection position assurance (CPA) features for establishing the connection therebetween. In some implementations, one of the first and second connectable members comprises a spring terminal configured to contact the exposed portion of the conductive circuit trace to establish the electrical connection therewith, wherein the spring terminal is electrically connectable to the second electrical connector.

In some implementations, the first and second connectable members are each substantially flat such that the FC is substantially perpendicular to a connection direction to the second electrical connector. In some implementations, the first and second connectable members define an angle such that the FC is angled with respect to a connection direction to the second electrical connector. In some implementations, one of the first and second connectable members of the first electrical connector and the second electrical connector define a second set of CPA features for establishing a connection therebetween. In some implementations, one of the first and second connectable members comprises a split-blade terminal having two prongs separated by a distance and configured to interface with another electrical terminal of the second electrical connector, and a spring terminal configured to mate with the exposed portion of the conductive circuit trace of the FC, wherein the spring terminal and the split-blade terminal are positioned on a longitudinal axis at opposing ends of the first electrical connector, and wherein the spring terminal comprises bifurcated contacts that are configured to interface with the exposed portion of the conductive circuit trace of the FC.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 1A-1B illustrate a view of an example electrical system connecting a device to a flexible circuit (FC) according to the prior art;

FIGS. 2A-2B illustrate views of a first example electrical system according to some implementations of the present disclosure;

FIGS. 3A-3E illustrate views of second and third example electrical systems according to some implementations of the present disclosure;

FIGS. 4A-4B illustrate views of example robotic installation features for the example electrical systems according to some implementations of the present disclosure;

FIG. 5 illustrates a flow diagram of an example method of forming an electrical system according to some implementations of the present disclosure;

FIG. 6 illustrates a view of another example electrical system connecting a device to an FPC according to the prior art;

FIGS. 7A-7B illustrate views of a fourth example electrical system according to some implementations of the present disclosure;

FIGS. 8A-8B illustrate views of a fifth example electrical system according to some implementations of the present disclosure;

FIG. 9 illustrates a view of an alternate configuration of the FC electrical connector of FIGS. 8A-8B;

FIG. 10 illustrates a flow diagram of another example method of forming an electrical system according to some implementations of the present disclosure;

FIG. 11 illustrates a top front perspective view of an example implementation of an example electrical connector according to some implementations of the present disclosure;

FIG. 12 illustrates an example implementation of the spring terminal from FIG. 11 connecting to the FC according to some implementations of the present disclosure;

FIG. 13 illustrates a top front perspective view of an example connector in which the electrical connector from FIG. 11 can be used to connect with the FC according to some implementations of the present disclosure; and FIG. 14 illustrates a sectional view of the electrical connector in FIG. 11, taken along section line 14-14.

DETAILED DESCRIPTION

Referring now to FIGS. 2A-2B, a first example electrical system 200 according to the principles of the present disclosure is illustrated. While the illustrations shown and described herein are in relation to the same electrical device system 102 of FIG. 1, it will be appreciated that the electrical systems of the present disclosure could be applicable to any suitable systems/devices, including, but not limited to, automotive RADAR, LIDAR, lighting devices, and electric motors. The electrical system 200 comprises an electrical connector 204 that is configured to physically secure and electrically connect a flexible circuit (FC) 208 to the electrical device system 102. While FCs are primarily discussed herein, it will be appreciated that the systems and methods of the present disclosure are applicable to any suitable conductors, such as any flexible circuits (FCs), of which FCs are a specific type. It will also be appreciated that while the term flexible printed circuit (FPC) is used herein, this is merely one example type or configuration of an FC. The FC 208 comprises three conductive circuit traces 212 disposed within or between one or more dielectric layers 216. While three conductive circuit traces 216 are shown (e.g., power, ground, and signal), it will be appreciated that the FC 208 could comprise any suitable number of conductive circuit traces 212. The FC 208 is different from the FC 120 of FIG. 1 in that it has been pre-processed to define one or more exposed portions (not shown) of the conductive circuit traces 216 on its bottom side. This processing could include, for example, laser processing the FC 208 to remove at least a portion of the dielectric layer 212 to expose the portion(s) of the conductive circuit traces 216. While laser processing is specifically described herein, it will be appreciated that other processing techniques could be utilized (e.g., physical cutting or stripping).

This exposed portion of the conductive circuit traces 216 are electrically contacted by spring terminals 232 at the ends of terminals (not shown) extending through a portion 228 of the electrical connector 204. This connection is made when a housing 220 and a cap 224 of the electrical connector 204 are physically secured together. As shown, the housing 220 of the electrical connector 204 is secured to the housing 108 of the electrical device system 102 via a clip or notch feature 236. The cap 224 of the electrical connector 204 is secured to the housing 220 of the electrical connector 204 via a lip or notch feature 240 of the housing 220 that slidably engages with a corresponding or complimentary groove feature 244 of the cap 224. It will be appreciated that the FC 208 could also define other connection features, such as a uniquely shaped portion of the FC 208 (e.g., a wider portion) or a unique identifier or barcode (e.g., etched into the dielectric layer 216). With housings 108 and 220 securely connected via clip or notch feature 236 and the FC 208 securable connected between housing 220 and cap 224 of the electrical connector 204, the spring terminal(s) 232 forcibly contact the exposed portion(s) of the conductive circuit trace(s) 212 thereby forming a good quality electrical connection between the FC 208 and the electrical device 104 of the electrical device system 102.

Referring now to FIGS. 3A-3E, second and third example electrical systems 300, 350 according to some implementations of the present disclosure are illustrated. While the illustrations shown and described herein are in relation to the same electrical device system 102 of FIG. 1, it will be appreciated that the electrical systems of the present disclosure could be applicable to any suitable systems/devices, including, but not limited to, automotive RADAR, LIDAR, lighting devices, and electric motors. In FIG. 3A, the fifth example electrical system 300 is illustrated. In this configuration, a cap-type electrical connector 304 physically secures to the housing 108 of the electrical device system 102 via a clip or notch feature 308 that is corresponds or is complimentary to an aperture or hole feature 312 in the cap-type electrical connector 304. The securing force causes exposed portion(s) (not shown) of the conductive circuit trace(s) 212 to electrically contact corresponding terminals (not shown), such as spring terminals, housed within the housing 108 and that electrically connect to the electrical device 104.

In FIGS. 3B-3C, the third example electrical system 350 is illustrated. This configuration is similar to but less complex and bulky than the second electrical system 200 of FIGS. 2A-2B. As shown, an electrical connector 354 (similar to electrical connector 204) that is physically securable to a shorter housing 358 of the electrical device system 102. FIG. 3D, for example, illustrates a cross-sectional view where terminals 378 electrically connected to the electrical device 104 extend substantially to an end 380 of the housing 358. Spring terminals 368 defined by the ends of the terminals 378 forcibly contact the exposed portion(s) of the conductive circuit trace(s) 212 when the FC 208 is physically secured between the housing 358 and the cap 362 via the corresponding or complimentary lip/notch features 370 of the housing 358 and the groove features 374 of the cap 362. An optional seal 368 is provided between these members to provide a more insulated electrical connection therein. This configuration may also provide for a stepped configuration or feature 384 for the FC 208 as shown in FIG. 3E, which could provide to be useful or beneficial for unique packaging situations.

The installation/removal of the FC 208 in the example electrical systems as illustrated and described herein could be performed manually by a human installer or robotically by a robotic installer. FIGS. 4A-4B, for example, illustrate two example robotic installation/removal examples 400A, 400B. A robotic installer 404 could be controlled, for example by an electronic controller (not shown) according to a set of computer-executable assembly or installation instructions. Robotic installation, for example, could save costs compared to human installation. In the first example 400A, a first end effector assembly 408 (e.g., end effector 412 that controls one or more shafts 416) is controlled by the robotic installer 404 to engage or disengage with robotic installation feature 420, which is illustrated as a cross-shaped or x-shaped slot. This robotic installation feature 420 can be defined by or attached to cap 428 of an electrical connector 424 (e.g., similar to electrical connector 200), which further comprises a housing 432 for secure connection to the electrical device system 102. It will be appreciated that other robotic installation features could be utilized (e.g., scannable identifiers or barcodes). For example, in the other example 400B, a second end effector assembly 462 (e.g., end effector 466 and a grasping assembly 474, such as two or four grasping fingers 470) is controlled by the robotic installer 404 to engage or disengage with robotic installation feature 478 (e.g., graspable edges) of an electrical connector 474. The electrical connector 474 is physically secured to a housing 458 of a different type of electrical device system 452, with a similar or different type of electrical device 454 disposed therein.

Referring now to FIG. 5, an example method 500 of forming an electrical system according to the principles of the present disclosure is illustrated. This method 500 could be applicable, for example, to any of the systems described above and illustrated in FIGS. 2A-2B, 3A-3E, and 4A-4B. At 504, the FC is obtained. At 508, the FC is processed (e.g., via laser processing or another suitable processing technique, such as manual cutting/stripping) to expose portion(s) of the conductive trace(s) therein. This processing could optionally include processing the FC to define other connection features (different widths, barcodes, etc.). At 512, the electrical device system is provided with an electrical device disposed within a housing. At 516, the electrical connector is provided for directly connecting the FC to the electrical device system. At 520, the electrical connector and the electrical device system are physically secured together with the FC therebetween and electrically connected to the electrical device of the electrical device system. The method 500 then ends or returns to 504 for one or more installation cycles. It will be appreciated that the method 500 could be performed manually by a human assembler/installer, robotically, or in some combination thereof as previously described herein. It will also be appreciated that at least some of these steps of method 500 could be performed in an opposing order to uninstall or disassemble the FC from the electrical device system (e.g., in order to replace a damaged FC).

Another conventional method for electrically connecting an FC to another electrical system involves permanently connecting the FC to the other electrical system via soldering, crimping, or similar means. FIG. 6, for example, illustrates an example electrical system 600 according to the prior art. A device 604 (e.g., an automotive radar device) defines a male electrical connector 608 that electrically connects to a female electrical connector 612. The female electrical connector 612 includes one or more round wires 616, which are then permanently connected to the conductive circuit trace(s) of an FC via soldering, crimping, or similar means. It would be desirable to provide an electrical connection between an FC and another electrical system that is detachable or removable (e.g., when component damage occurs). Additionally, conventional FC electrical connectors are bulky and can take up valuable packaging space and/or increase weight. Thus, while conventional FC connection methods work for their intended purpose, there exists an opportunity for improvement in the relevant art.

Referring now to FIGS. 7A-7B, a fourth example electrical system 700 according to the principles of the present disclosure is illustrated. While the illustrations shown and described herein are in relation to the same device 604 of FIG. 6, it will be appreciated that the electrical systems of the present disclosure could be applicable to any suitable devices, including, but not limited to, automotive RADAR, LIDAR, lighting devices, and electric motors. The electrical system 700 comprises a first electrical connector 704 that is configured to physically secure and electrically connect a flexible FC 708 to the second electrical connector 608 of the device 604. The FC 708 comprises three conductive circuit traces 712 disposed within or between one or more dielectric layers 716. While three conductive circuit traces 716 are shown (e.g., power, ground, and signal), it will be appreciated that the FC 708 could comprise any suitable number of conductive circuit traces 712. The FC 708 is different from the FC 620 of FIG. 6 in that it has been pre-processed to define one or more connection features 720. This processing could include, for example, laser processing the FC 708 to alter its shape and/or to remove at least a portion of the dielectric layer 712 to expose a portion of the conductive circuit traces 716. While laser processing is specifically described herein, it will be appreciated that other processing techniques could be utilized (e.g., physical cutting or stripping).

As shown, a portion of the dielectric layer 716 has been removed via laser processing such that a portion of the conductive circuit traces 712 are exposed. This exposed portion of the conductive circuit traces 716 is one of the one or more connection features 720 (e.g., exposed portions of the conductive circuit traces 712). It will be appreciated that the FC 708 could define other connection features, such as a uniquely shaped portion (described in greater detail later herein) or a unique identifier or barcode (e.g., etched into the dielectric layer 716). The fourth electrical connector 704 comprises first and second connectable members 724, 728. While the first connectable member 724 is illustrated as a connector (male) that is inserted into the second electrical connector 608 (female), it will be appreciated that the opposite configuration could be utilized. The first and second connectable members 724, 728 are connectable using a first set of connection position assurance (CPA) features 732. While a snap-in type CPA feature 732 is illustrated, it will be appreciated that other suitable CPA feature configurations could be utilized. The first connectable member 724 is similarly connectable to the second electrical connector 608 using a second set of CPA features 736. Once the FC 708 is properly aligned (e.g., using the connection feature(s) 720), the first and second members 724, 728 are connected thereby physically securing the FC 708 therein. A seal 740 could be optionally included to seal and protect the portion of the FC 708 from the environment (dust, moisture, etc.).

The first connectable member 724 also houses electrical connections 744, which engage the exposed portions of the conductive traces 712. These electrical connections 744 could be spring-loaded connections that slightly compress when the FC 708 is forced down thereupon in response to the first and second connectable members 724, 728 being connected. It will be appreciated that any suitable type or configuration of the electrical connections 744 could be utilized. These electrical connections 744 in turn connect to respective electrical connections (not shown) of the second electrical connector 608. The installation/removal of the FC 708 within/from the first electrical connector 704 and the installation/removal of the first electrical connector 704 (with the FC 708 therein) with/from the second electrical connector 608 could be performed manually by a human installer or robotically by a robotic installer 624 in any suitable combination. The robotic installer 624 could be controlled, for example by an electronic controller (not shown) according to a set of computer-executable assembly or installation instructions. Robotic installation, for example, could save costs compared to human installation. In the robotic installation example, an end effector 628 of the robotic installer 624 could interact with robotic installation features (identifiers, engageable slots, etc.). A specific robotic installation feature will be shown in FIGS. 8A-8B and FIG. 9 and described in greater detail below.

Referring now to FIGS. 8A-8B, a fifth example electrical system 800 according to the principles of the present disclosure is illustrated. Again, while the illustrations shown and described herein are in relation to the same device 604 of FIG. 6, it will be appreciated that the electrical systems of the present disclosure could be applicable to any suitable devices, including, but not limited to, automotive RADAR, LIDAR, lighting devices, and electric motors. The electrical system 800 comprises a first electrical connector 804 that is configured to physically secure and electrically connect an FC 808 to the second electrical connector 608 of the device 604. The FC 808 comprises two conductive circuit traces 812 disposed within or between one or more dielectric layers 816. While two conductive circuit traces 816 are shown, it will be appreciated that the FC 808 could comprise any suitable number of conductive circuit traces 812. The FC 808 is different from the FC 620 of FIG. 6 and the FC 208 of FIG. 2 in that it has been pre-processed to define connection features 820a, 820b (e.g., using laser processing and/or other suitable processing techniques. As shown, a portion of the dielectric layer 816 has been removed via laser processing such that a portion of the conductive circuit traces 812 are exposed. This exposed portion of the conductive circuit traces 816 corresponds to a first connection feature 820a. Also shown is a wider portion of the FC 808 compared to a remainder of the FC 808. This wider portion of the FC 808 corresponds to a second connection feature 820b. It will be appreciated that the FC 808 could also include other connection features, such as a unique identifier or barcode (e.g., etched into the dielectric layer 816).

The first electrical connector 804 comprises first and second connectable members 824, 828. While the first connectable member 824 is illustrated as a connector (male) that is inserted into the second electrical connector 608 (female), it will be appreciated that the opposite configuration could be utilized. The first and second connectable members 824, 828 are connectable using a first set of CPA features 832. While a clip-type CPA feature 832 is illustrated, it will be appreciated that other suitable CPA feature configurations could be utilized. The first connectable member 824 is similarly connectable to the second electrical connector 608 using a second set of CPA features 836. Once the FC 808 is properly aligned (e.g., using the connection feature(s) 820a, 820b), the first and second members 824, 828 are connected thereby physically securing the FC 808 therein. A seal 840 could be optionally included to seal and protect the portion of the FC 808 from the environment (dust, moisture, etc.). The first electrical connector 804 may be superior to the fifth electrical connector 704 of FIGS. 7A-7B in that the FC 808 has been processed to define the second connection feature 820b, which could further assist in the alignment/installation of the FC 808 and/or could provide for improved securability of the FC 808 therein.

As previously discussed, the installation or assembly could be performed manually by a human installer or robotically by a robotic installer 624 in any suitable combination. In the robotic installation example, an end effector 628 of the robotic installer 624 could interact with robotic installation feature 848, which is illustrated as a hexagonal-shaped slot. It will be appreciated that other robotic installation features could be utilized (e.g., scannable identifiers or barcodes). In the illustrated example, the end effector 628 of the robotic installer 624 is configured to interact with the robotic installation feature 848. For example only, the end effector 628 could comprise two or more members each defining an L-shape such that their distal ends can engage a base or bottom portion of the robotic installation feature 848. It will be appreciated that other shaped or configured robotic installation features and/or end effectors could be utilized. Non-limiting examples of the robotic installation feature 848 include a gripping or grasping member (e.g., a clamp) that is configured to grip or grasp an X-shaped gripping or grasping feature that is attached to the outer surface of the first electrical connector 804. Again, it will be appreciated that other shapes could be utilized (a round bar, a flat bar, a circular disc, an equal armed cross shape, a t-shape, a keyhole slot, etc.).

Referring now to FIG. 9, an alternate configuration 900 of the first electrical connector 804 of the electrical system 800 of FIGS. 8A-8B (hereinafter, "first electrical connector 900") according to the principles of the present disclosure is illustrated. While not shown, the first electrical connector 900 is similarly connectable to the second electrical connector 608 of device 604 as illustrated in FIGS. 8A-8B. The first electrical connector 900 provides a different configuration than the first electrical connector 804 of FIGS. 8A-8B. More particularly, in the electrical system 800 of FIGS. 8A-8B, the first and second connectable members 824, 828 of the first electrical connector 804 are each substantially flat such that the FC 808 is substantially perpendicular to a connection direction 852 (i.e., vertical) to the second electrical connector 608. In contrast, in the first electrical connector 900 of FIG. 9, the first and second connectable members 920, 924 define an angle 948 such that the FC 904 is angled with respect to the connection direction 952 (i.e., vertical) to the second electrical connector (i.e., second electrical connector 608). The first electrical connector 900 therefore may be desirable for specific installations, such as an installation having ample vertical packaging space but limited lateral packaging space. The remaining features 904-944 generally correspond to the same features 804-844 of electrical system 800, although some are slightly modified due to the angled configuration (e.g., the spring contact electrical connectors 940).

Referring now to FIG. 10, another example method 1000 of forming an electrical system according to the principles of the present disclosure is illustrated. This method 1000 could be applicable, for example, to any of the systems described above and illustrated in FIGS. 7A-2B, 7A-8B, and 9. At 1004, the FC is obtained. At 1008, the FC is processed (e.g., via laser processing or another suitable processing technique, such as manual cutting/stripping) to define the one or more connection features (exposed conductive circuit traces, a wider shape/profile, etc.). At 1012, the first electrical connector is obtained for securing and electrically connecting the FC to a second electrical connector (e.g., second electrical connector 108 of device 104). At 1016, the FC is securely installed within the first electrical connector (e.g., including electrically connecting the first electrical connector therewith). At 1020, the first electrical connector is electrically connected to the second electrical connector, thereby electrically connecting the FC to the second electrical connector. The method 1000 then ends or returns to 1004 for one or more installation cycles. It will be appreciated that the method 1000 could be performed manually by a human assembler/installer, robotically, or in some combination thereof as previously described herein. It will also be appreciated that at least some of these steps of method 1000 could be performed in an opposing order to uninstall or disassemble the FC from the first and second electrical connectors (e.g., in order to replace a damaged FC).

FIG. 11 illustrates a top front perspective view 1100 of another example implementation of an electrical connector terminal. In this illustrated example, the terminal 1100 includes the split-blade terminal 1102 at one end, which has prongs 1106 configured to mate with a blade terminal or a pin terminal. At the opposing end, the electrical connector includes the spring terminal 1104. The spring terminal 1104 in this example has an arcuate shape (e.g., curved L-shape) and is configured to interface with an FC that does not run perpendicular to a longitudinal axis 1112 of the terminal 1100. Rather, the spring terminal 1104 in this example has a contact surface 1108 that is within a range of 30 to 60 degrees from the longitudinal axis 1112. In aspects, the terminal 1100 includes one or more bends (e.g., bend 1106) such that the spring terminal 1104 and the split-blade terminal 1102 are rotated relative to one another about the longitudinal axis 1112 by approximately 90 degrees. The spring terminal 1104 also includes a protrusion, such as protrusion 1110.

FIG. 12 illustrates example implementations 1200 of the spring terminal 1104 from FIG. 11 connecting to an FC. View 1200-1 illustrates the spring terminal 1104 approaching the flat-wire conductors 1208 of the wiring 1206 in a direction corresponding to the longitudinal axis 1204 of the terminal 1100. In view 1200-2, the terminal 1100 is pressed against the flat-wire conductors 1208, based on a longitudinal compression force along the longitudinal axis 1204 of the terminal 1100. Due to the angle of the contact not being perpendicular to the compression force, the protrusion 1110 may slidably move along the flat-wire conductor 1208 a short distance. This slidable movement may wipe away debris that might be on the flat-wire conductor 1208, providing a clean surface to interface with the spring terminal 1104.

FIG. 13 illustrates a top front perspective view 1300 of an example connector in which the spring terminal from FIG. 11 can be used to connect with the FC. Here, the housing 1302 is connected to a retainer 1304 on opposing sides of the wiring 1206. The retainer 1304 compresses the wiring 1206 against the spring terminals 1104 of the terminal 1100 housed within the housing 1302 and secures the wiring 1206 in place, which maintains contact with the terminal 1100.

Lastly, FIG. 14 illustrates a sectional view 1400 of the connector in FIG. 13, taken along section line 14-14. In the sectional view 1400, the spring terminal 204 is contacting the wiring 106 based on a compression force provided by the housing 1302 and the retainer 1304 being fastened together on opposing sides of the wiring 1206. The compression force is in a longitudinal direction of the terminal 1100. The housing 1302 includes an opening to allow an electrical component to mate with the split-blade terminal 202 of the terminal 1100.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical system, comprising:
   a flexible circuit (FC) comprising at least one conductive circuit trace disposed within or between one or more dielectric layers and defining at least one exposed conductive circuit trace portion in a middle portion along a length of the FC such that first/second portions of the FC extend before/after the exposed conductive circuit trace portion;
   an electrical device system comprising an electrical device disposed within a housing of the electrical device system;
   an electrical connector configured to physically secure and electrically connect the at least one exposed conductive circuit trace portion to the electrical device of the electrical device system, wherein a housing of the electrical connector and the electrical device system housing define at least one connection feature for physically securing to each other; and
   a sealing cap member configured to engage the electrical connector housing and sealably fix the FC therebetween by providing a compressive downward force thereupon and defining first and second openings such that the first/second portions of the FC extend before/after the sealing cap member.

2. The electrical system of claim 1, wherein the at least one connection feature comprises two opposing clips defined by the housing of the electrical device that are configured to be mated to two corresponding opposing apertures defined by the electrical connector.

3. The electrical system of claim 1, wherein the sealing cap member comprises a cap member with a sealing ring disposed around its outer edge.

4. The electrical system of claim 1, wherein the electrical connector housing defines a male connector configuration and the electrical device system housing defines a corresponding female connector configuration.

5. The electrical system of claim 1, wherein the FC comprises three conductive circuit traces and defines three exposed conductive circuit trace portions that contact three conductive terminals within the electrical connector housing, and wherein the electrical device system comprises a corresponding three conductive terminals within the electrical device system housing that electrically connect the three conductive terminals of the electrical connector with the electrical device.

6. The electrical system of claim 5, wherein the three conductive terminals within the electrical connector housing are spring-loaded connections that slightly compress in response to the compressive downward force by the sealing cap member.

7. The electrical system of claim 5, wherein the three conductive circuit traces, the three exposed conductive circuit trace portions, the three conductive terminals within the electrical connector housing, and the corresponding three conductive terminals within the electrical device system housing are configured to connect to power, ground, and signal connections for the electrical device, respectively.

8. A method of forming an electrical system, the method comprising:
   providing a flexible circuit (FC) comprising at least one conductive circuit trace disposed within or between one or more dielectric layers and defining at least one exposed conductive circuit trace portion in a middle portion along a length of the FC such that first/second portions of the FC extend before/after the exposed conductive circuit trace portion;
   providing an electrical device system comprising an electrical device disposed within a housing of the electrical device system
   providing an electrical connector configured to physically secure and electrically connect the at least one exposed conductive circuit trace portion to the electrical device of the electrical device system, wherein a housing of the electrical connector and the electrical device system housing define at least one connection feature for physically securing to each other; and
   providing a sealing cap member configured to engage the electrical connector housing and sealably fix the FC therebetween by providing a compressive downward force thereupon and defining first and second openings such that the first/second portions of the FC extend before/after the sealing cap member.

9. The method of claim 8, wherein the at least one connection feature comprises two opposing clips defined by the housing of the electrical device that are configured to be mated to two corresponding opposing apertures defined by the electrical connector.

10. The method of claim 8, wherein the sealing cap member comprises a cap member with a sealing ring disposed around its outer edge.

11. The method of claim 8, wherein the electrical connector housing defines a male connector configuration and the electrical device system housing defines a corresponding female connector configuration.

12. The method of claim 8, wherein the FC comprises three conductive circuit traces and defines three exposed conductive circuit trace portions that contact three conductive terminals within the electrical connector housing, and wherein the electrical device system comprises a corresponding three conductive terminals within the electrical device system housing that electrically connect the three conductive terminals of the electrical connector with the electrical device.

13. The method of claim 12, wherein the three conductive terminals within the electrical connector housing are spring-loaded connections that slightly compress in response to the compressive downward force by the sealing cap member.

14. The method of claim 12, wherein the three conductive circuit traces, the three exposed conductive circuit trace portions, the three conductive terminals within the electrical connector housing, and the corresponding three conductive terminals within the electrical device system housing are configured to connect to power, ground, and signal connections for the electrical device, respectively.

15. An electrical system, comprising:
   a flexible circuit (FC) means comprising at least one conductive circuit trace means disposed within or between one or more dielectric layer means and defining at least one exposed conductive circuit trace portion means in a middle portion along a length of the FC means such that first/second portions of the FC means extend before/after the exposed conductive circuit trace portion means;

an electrical device system means comprising an electrical device means disposed within a housing means of the electrical device system means;

an electrical connector means for physically securing and electrically connecting the at least one exposed conductive circuit trace portion means to the electrical device means of the electrical device system means, wherein the electrical connector means and the electrical device system housing means define at least one connection feature means for physically securing to each other; and a sealing cap member means for engaging the electrical connector housing means and sealably fixing the FC means therebetween by providing a compressive downward force thereupon and defining first and second openings such that the first/second portions of the FC means extend before/after the sealing cap member means.

16. The electrical system of claim 15, wherein the at least one connection feature means comprises two opposing clip means defined by the housing means of the electrical device means and for mating to two corresponding opposing aperture means defined by the electrical connector means.

17. The electrical system of claim 15, wherein the electrical connector housing means defines a male connector configuration and the electrical device system housing means defines a corresponding female connector configuration.

18. The electrical system of claim 15, wherein the FC means comprises three conductive circuit trace means and defines three exposed conductive circuit trace portion means that contact three conductive terminal means within the electrical connector housing means, and wherein the electrical device means comprises a corresponding three conductive terminal means within the electrical device system housing means that electrically connect the three conductive terminal means of the electrical connector means with the electrical device means.

19. The electrical system of claim 18, wherein the three conductive terminal means within the electrical connector housing means are spring-loaded connections that slightly compress in response to the compressive downward force by the sealing cap member means.

20. The electrical system of claim 18, wherein the three conductive circuit trace means, the three exposed conductive circuit trace portion means, the three conductive terminal means within the electrical connector housing means, and the corresponding three conductive terminal means within the electrical device system housing means are configured to connect to power, ground, and signal connections for the electrical device means, respectively.

* * * * *